United States Patent
Jinno

(10) Patent No.: US 8,027,058 B2
(45) Date of Patent: Sep. 27, 2011

(54) IMAGE PROCESSING APPARATUS AND METHOD

(75) Inventor: Takayuki Jinno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1207 days.

(21) Appl. No.: 11/697,343

(22) Filed: Apr. 6, 2007

(65) Prior Publication Data

US 2007/0243314 A1    Oct. 18, 2007

(30) Foreign Application Priority Data

Apr. 12, 2006  (JP) ................................. 2006-110101

(51) Int. Cl.
*H04N 1/409* (2006.01)
*B41J 2/205* (2006.01)

(52) U.S. Cl. ............... 358/1.9; 358/3.26; 37/15; 37/101

(58) Field of Classification Search .................... 358/1.9, 358/2.1, 3.02, 3.06, 3.09, 3.26, 1.13, 1.14, 358/1.15, 1.18; 347/1, 3, 5, 14, 15, 19, 43, 347/101
See application file for complete search history.

(56) References Cited

U.S. PATENT DOCUMENTS

| | | | | |
|---|---|---|---|---|
| 6,341,833 B1 * | 1/2002 | Liu et al. ........................ | 347/15 |
| 6,715,869 B1 * | 4/2004 | Reem et al. .................... | 347/100 |
| 7,216,967 B2 * | 5/2007 | Matsuzawa et al. ........... | 347/101 |
| 7,244,299 B2 * | 7/2007 | Tsuji et al. .................... | 347/100 |
| 7,275,806 B2 * | 10/2007 | Matsuzawa et al. ............ | 347/43 |
| 7,316,473 B2 * | 1/2008 | Matsuzawa et al. ........... | 347/100 |
| 7,322,687 B2 * | 1/2008 | Tomotake et al. ............. | 347/100 |
| 7,331,649 B2 * | 2/2008 | Matsuzawa et al. ............ | 347/43 |
| 2004/0094065 A1 * | 5/2004 | Reem et al. .................... | 347/105 |
| 2006/0017759 A1 * | 1/2006 | Matsuzawa et al. ............ | 347/15 |
| 2006/0017760 A1 * | 1/2006 | Matsuzawa et al. ............ | 347/15 |
| 2006/0017761 A1 * | 1/2006 | Matsuzawa et al. ............ | 347/15 |
| 2006/0017767 A1 * | 1/2006 | Matsuzawa et al. ............ | 347/21 |
| 2007/0216954 A1 * | 9/2007 | Kakutani ...................... | 358/3.06 |
| 2007/0266887 A1 * | 11/2007 | Koganehira et al. .......... | 106/31.6 |
| 2007/0296990 A1 * | 12/2007 | Kakutani ....................... | 358/1.9 |
| 2008/0123148 A1 * | 5/2008 | Takahashi et al. ............ | 358/3.13 |
| 2008/0130024 A1 * | 6/2008 | Kakutani ....................... | 358/1.9 |
| 2008/0259361 A1 * | 10/2008 | Kakutani ....................... | 358/1.8 |
| 2009/0231402 A1 * | 9/2009 | Nakano ........................ | 347/100 |

FOREIGN PATENT DOCUMENTS

| | | |
|---|---|---|
| JP | 2001-136401 | 5/2001 |
| JP | 2001-138555 | 5/2001 |
| JP | 2002-059571 | 2/2002 |

* cited by examiner

*Primary Examiner* — Kimberly A Williams

(74) *Attorney, Agent, or Firm* — Fitzpatrick, Cella, Harper & Scinto

(57) ABSTRACT

A color region in which the difference of a bronzing between different colors is to be decreased is set in accordance with preset printing conditions, and a bronzing of a printing medium with a predetermined chromaticity is measured. The measured bronzing measurement value is held, and color separation data to decrease the difference of the measurement value between the different colors in the color region is generated based on the held bronzing measurement value.

10 Claims, 10 Drawing Sheets

IMAGE PROCESSING APPARATUS AND METHOD

BACKGROUND OF THE INVENTION

1. Field of the Invention

The present invention relates to an image processing apparatus which converts image data into printing data for a printing apparatus by using color separation data and outputs the printing data, and a method thereof.

2. Description of the Related Art

Various types of image forming apparatuses used for word processors, personal computers, facsimile apparatuses, and the like are available. An apparatus which prints a text and image by attaching a printing material onto a printing medium has been practically used. A representative example of this printing type is an inkjet printer. The inkjet printer presents halftone by spatial arrangements of ink dots discharged from the printhead. In a region with a low dot density, i.e., highlight portion, the printed dots are visually noticeable, thereby enhancing graininess.

As described in Japanese Patent Laid-Open No. 2002-059571, a technique of making graininess unnoticeable in a highlight portion is available, in which light color materials such as Lc (Light cyan) and Lm (Light magenta) are used in addition to the four colors (CMYK) of the conventional basic color materials.

With the rapid prevalence of color inkjet printers in recent years, a demand for a high-quality image has arisen. Particularly, there is a demand to print a sharper image by expanding a color gamut reproducible by a printer. Upon expanding the color gamut, a color region reproducible by one of three colors C, M, and Y can be expanded by improving the color development properties or density of the color material. However, the conventional four colors CMYK can form only a limited color gamut, particularly for a color region with high chroma of R, G, and B regions formed by the color materials of two or more colors. Therefore, Japanese Patent Laid-Open No. 2001-136401 discloses a method of forming an image by adding a high-chroma color other than the subtractive primaries, i.e., specific color ink in addition to the basic color materials of four colors CMYK upon expanding the color gamut.

On the other hand, along with the improvement of image quality in color inkjet printers, printing digital images using the color inkjet printer, i.e., so-called photographic printing is becoming increasingly popular. As such photographic printing becomes popular, the storage life of a print is becoming regarded as important. Conventionally, dye ink has been mainly used as a color material for an inkjet printer. However, since the dye ink has poor storage properties, pigment ink with good storage properties is sometimes used. It is known that when the pigment ink is used in printing, a bronzing color unlike the original color of illumination is seen in the illumination image reflected on the surface of the print. This phenomenon is called bronzing. In order to suppress the occurrence of bronzing, Japanese Patent Laid-Open No. 2001-138555 proposes a method of determining color separation which suppresses bronzing by visually setting a patch which generates the least bronzing for each injection ratio from a patch image group obtained by changing the black level and UCR (Under Color Removal) ratio. A phenomenon called uneven bronzing in which bronzing that shows different tints in the different chromaticities is seen is also known.

As described above, with an increase in the number of color materials used in a color inkjet printer in recent years, when the color materials of two or more colors are used to reproduce a desired color, the number of combinations of the color materials increases. The degree of the bronzing viewed in a printed image differs depending on the combination of color materials. In order to select an optimum combination from various combinations of a plurality of color materials to reproduce a desired color, the combination of color materials is determined based on the evaluation value of graininess and of the size (or extent) of the reproducible color region. This technique is already in use.

Upon printing, a smallest bronzing appearance amount is not simply regarded as best. Bronzing with a different tint appears due to the difference of the reproduced chromaticity, thereby deteriorating the image quality of a printed image including a plurality of colors. That is, suppression of uneven bronzing is also regarded as important. Therefore, as in the above-described Japanese Patent Laid-Open No. 2001-138555, a color separation method has been proposed which considers suppression of bronzing as well as image quality determination factors such as graininess.

However, since the above-described method depends on visual evaluation by an image observer, a person must view and evaluate a number of images, resulting in a considerable cost. In addition, stable evaluation values cannot be obtained due to a change in the physical condition of the image observer and a change of image observers. Although bronzing can be suppressed to some extent by the above method, uneven bronzing which seriously causes image quality deterioration cannot be suppressed.

The feature of the present invention is to solve the problems of the above-described conventional techniques.

According to the features of the present invention, optimal color separation can be performed in accordance with printing conditions and image data to be printed.

SUMMARY OF THE INVENTION

According to an aspect of the present invention, there is provided an image processing method of generating, for a predetermined gamut, color separation data corresponding to a color material used in a printing apparatus, comprising:

a color region setting step of setting, in accordance with a preset printing condition, a color region in which a difference of a bronzing between different colors is to be decreased;

a bronzing measurement step of measuring a bronzing of a printing medium with a predetermined chromaticity;

a bronzing holding step of holding a bronzing measurement value measured in the bronzing measurement step; and a color separation data generation step of generating color separation data to decrease a difference of the bronzing measurement value between different colors in the color region on based on the bronzing measurement value held in the bronzing holding step.

According to another aspect of the present invention, there is provided an image processing apparatus which converts image data into printing data for a printing apparatus by using color separation data and outputs the printing data, comprising:

a storage unit adapted to store characteristic data of a plurality of images printed under a plurality of printing conditions including a printing condition acceptable by the printing apparatus;

a color distribution generation unit adapted to generate a color distribution based on each pixel data value of input image data; and a color separation data generation unit adapted to generate color separation data by extracting from the storage unit characteristic data to decrease a difference of a bronzing of an image to be printed, in accordance with a printing condition for printing an image by the printing apparatus and a color distribution of the input image data.

According to still another aspect of the present invention, there is provided an image processing apparatus which converts image data into printing data for a printing apparatus by using color separation data and outputs the printing data, comprising:

a storage unit adapted to store characteristic data of a plurality of images printed under a plurality of printing conditions including a printing condition acceptable by the printing apparatus;

an indication unit adapted to indicate an attribute of an input image; and a color separation data generation unit adapted to generate color separation data by extracting from the storage unit characteristic data to decrease a difference of a bronzing of an image to be printed, in accordance with a printing condition for printing an image by the printing apparatus and the attribute of the image indicated by the indication unit.

According to yet another aspect of the present invention, there is provided an image processing method of converting image data into printing data for a printing apparatus by using color separation data and outputting the printing data, comprising:

a color distribution generation step of generating a color distribution based on each pixel data value of input image data; and a color separation data generation step of generating color separation data by extracting, from a memory storing characteristic data of a plurality of images printed under a plurality of printing conditions including a printing condition acceptable by the printing apparatus, characteristic data to decrease a difference of a bronzing of an image to be printed, in accordance with a printing condition for printing an image by the printing apparatus and a color distribution of the input image data.

According to still yet another aspect of the present invention, there is provided an image processing method of converting image data into printing data for a printing apparatus by using color separation data and outputting the printing data, comprising:

an indication step of indicating an attribute of an input image; and a color separation data generation step of generating color separation data by extracting, from a memory storing characteristic data of a plurality of images printed under a plurality of printing conditions including a printing condition acceptable by the printing apparatus, characteristic data to decrease a difference of a bronzing of an image to be printed, in accordance with a printing condition for printing an image by the printing apparatus and the attribute of the image indicated in the indication step.

Further features of the present invention will become apparent from the following description of exemplary embodiments with reference to the attached drawings.

DESCRIPTION OF THE EMBODIMENTS

Preferred embodiments of the preset invention will be described below in detail with reference to the accompanying drawings. Note that the embodiments to be described below do not limit the present invention according to the scope of the claims, and not all combinations of the features to be described in the embodiments are always necessary for the solution according to the present invention.

First Embodiment

Figure 1:
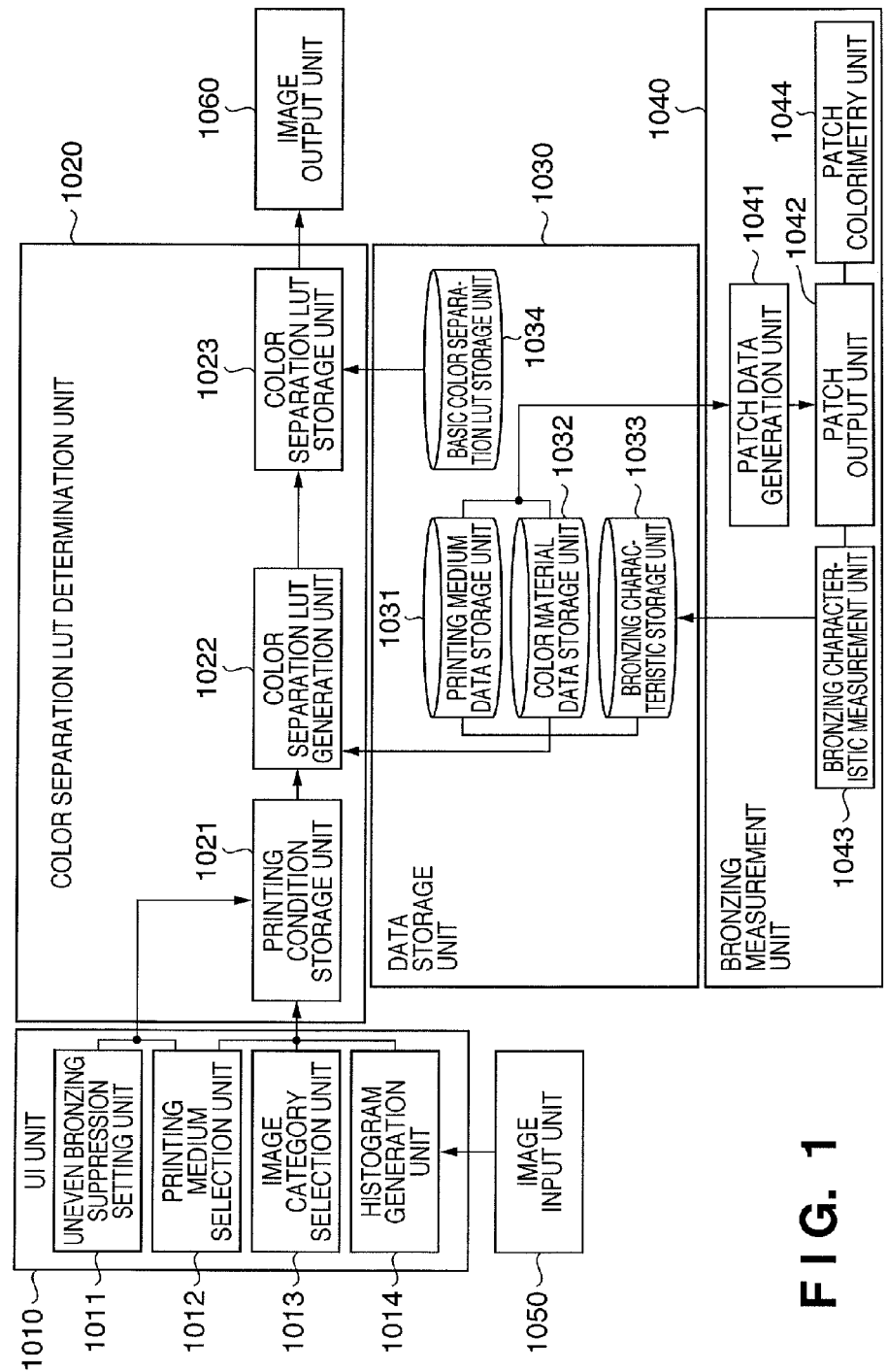
FIG. 1 is a block diagram showing the structure of an image processing apparatus according to an embodiment of the present invention.

FIG. 1 is a block diagram showing the structure of an image processing apparatus according to an embodiment of the present invention.

A UI (User Interface) unit 1010 is used to select a method of suppressing uneven bronzing when a user uses the image processing apparatus to output an image. The UI unit 1010 includes an uneven bronzing suppression setting unit 1011 to set by the user whether to perform uneven bronzing suppression processing and a printing medium selection unit 1012 to select by the user a printing sheet (printing medium) to be used by an image output unit 1060 such as a printer. The UI unit 1010 also includes an image category selection unit 1013 to select the kind of an input image by the user. The UI unit 1010 further includes a histogram generation unit 1014 to set by the user whether to generate a histogram (color distribution) of input signal values such as RGB based on the image input by an image input unit 1050.

A detailed example of each function of the UI unit 1010 will be described later. The UI unit 1010 may be included in, for examples a driver of a printing apparatus such as a printer. Alternatively, the UI unit 1010 may be included as an application program for generating a color separation LUT (Look-Up Table) separately from the driver of the printing apparatus.

A color separation LUT determination unit 1020 determines, in accordance with printing conditions of, for example, the input image or printing medium selected by the user using the UI unit 1010, whether to generate an optimum color separation LUT for controlling uneven bronzing or refer to a predetermined color separation LUT. The color separation LUT determination unit 1020 thus determines a color separation LUT to be used to print an image by the image output unit 1060. A printing condition storage unit 1021 stores the printing conditions selected by the UI unit 1010. The printing conditions include the kind of a printing medium (printing sheet) to be used for printing, a color material (e.g., ink, toner) to be used, and information (to be described later) about a color region in which uneven bronzing is to be suppressed. A color separation LUT generation unit 1022 generates a color separation LUT from the printing conditions stored in the printing condition storage unit 1021 and color material information, printing medium information, and bronzing information stored in a data storage unit 1030. A color separation LUT storage unit 1023 stores the color separation LUT generated by the color separation LUT generation unit 1022 or a color separation LUT stored in a basic color separation LUT storage unit 1034 in advance. Input image data is color-separated by using the color separation LUT stored in the color separation LUT storage unit 1023, and the image output unit 1060 prints an uneven bronzing-controlled image based on the color-separated image data. In this embodiment, the image output unit 1060 is a printer to print a color image based on input color image data. Color separation in this embodiment indicates processing for separating image data such as RGB into data of color components to be output by the image output unit 1060.

A data storage unit 1030 stores as data in advance information about the printing medium and color material to be used by the image output unit 1060 and, in addition, a bronzing characteristic generated from the combination of the printing medium and color material. A printing medium data storage unit 1031 stores the kinds of the printing media to be used by the image output unit 1060. A color material data storage unit 1032 stores all the kinds of color materials (e.g., ink and toner) used by the image output unit 1060. A bronzing characteristic storage unit 1033 stores a bronzing characteristic generated from a combination of the kind of the printing medium stored in the printing medium data storage unit 1031 and the kind of the color material stored in the color material data storage unit 1032. The basic color separation LUT storage unit 1034 stores a color separation LUT in advance which is used when a user sets, using the uneven bronzing suppression setting unit 1011, not to perform uneven bronzing suppression processing. Generally, the relationship between uneven bronzing and other image quality factors (e.g., graininess or tone character) is often a trade-off. Hence, when another image quality factor is considered more important than uneven bronzing suppression, the user may set not to perform uneven bronzing suppression processing by the uneven bronzing suppression setting unit 1011. In this case, a color separation LUT which considers, for example, suppression of the graininess is used. The image quality element to be considered is not limited to graininess, and may be the tone characteristic or color gamut.

A bronzing measurement unit 1040 measures a bronzing characteristic to be stored in the bronzing characteristic storage unit 1033. A patch data generation unit 1041 finds a combination of color materials to reproduce a predetermined chromaticity from all combinations of a kind of printing medium stored in the printing medium data storage unit 1031 and the kinds of color materials stored in the color material data storage unit 1032. When color materials of a color lighter than the basic colors, that is for example, light cyan and light magenta, or specific color materials such as red, green, and blue are used, a number of combinations of the color materials to reproduce the predetermined chromaticity are present. The patch data generation unit 1041 generates patch data by changing each color materials by a certain amount, and a patch output unit 1042 prints the patch data by using the image output unit 1060. A patch colorimetry unit 1044 colorimetically measures the patch image thus printed and a bronzing characteristic measurement unit 1043 measures the bronzing characteristic. That is, the bronzing measurement unit 1040 can obtain a measurement value and bronzing characteristic corresponding to the combination of a predetermined printing medium and a color material of a predetermined amount. The bronzing characteristic storage unit 1033 stores bronzing characteristic data obtained in this manner. The bronzing measurement unit 1040 appropriately performs this process when the image output unit 1060 is changed to another model, when a predetermined period of time has elapsed even when the same model is used, or when a color material to be used is changed. The characteristic data obtained in this manner is used to generate a color separation table for suppressing bronzing.

In this embodiment, paper such as glossy paper, plain paper, or art paper can be used as a printing medium. However, the present invention is not limited to these. Dye ink, pigment ink, and toner are available as the color material described above. However, the present invention is not limited to these. The printing apparatus (image output unit 1060) in this embodiment is an inkjet printer of multifunctional peripheral device or an electrophotographic printer or copying machine. However, the printing apparatus is not limited to these, and may be, for example, a thermal transfer printer.

Figure 2:
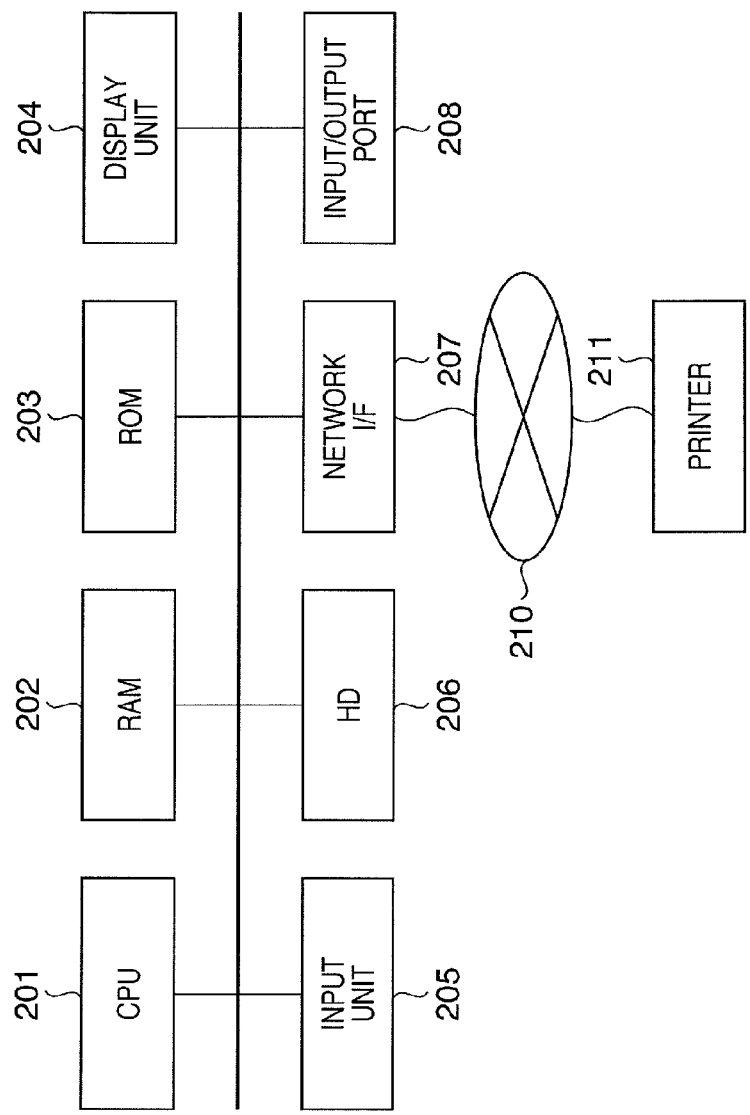
FIG. 2 is a block diagram for explaining the hardware arrangement of the image processing apparatus according to the embodiment.

FIG. 2 is a block diagram for explaining the hardware arrangement of the image processing apparatus according to this embodiment.

Referring to FIG. 2, a CPU 201 controls the operation of the overall information processing apparatus in accordance with programs stored in a RAM 202 and ROM 203. The RAM 202 is used as a main memory of the CPU 201 and loaded with a program executed by the CPU 201. The RAM 202 provides a work area for temporarily storing various data upon a control operation by the CPU 201. The ROM 203 nonvolatilizably stores a boot program and various data. An input unit 205 includes a pointing device such as a keyboard or mouse used to input various data and commands by user's operation. A display unit 204 includes a CRT or liquid crystal display unit and the like used to display data to be processed and a UI window (to be described later). An external storage device (HD) 206 is a mass storage device on which an OS, various application programs, printer drivers, and data are installed in advance. Upon indication to start a program, it is loaded into the RAM 202 and executed. A network interface 207 controls an interface with a network 210 such as a LAN. A plurality of printers 211 and various types of input/output devices are connected to the network 210. An input/output port 208 is an interface such as USB or IEEE1394, which connects to, e.g., the image output unit 1060 and image input unit 1050 shown in FIG. 1.

<Detail of UI Unit 1010>

The UI unit 1010 according to this embodiment will be described in detail with reference to FIGS. 3 and 4. The detailed processing content of a command designated in a GUI by the user will be described later. The UI unit 1010 is implemented by the input unit 205 and display unit 204 in FIG. 2.

Figure 3:
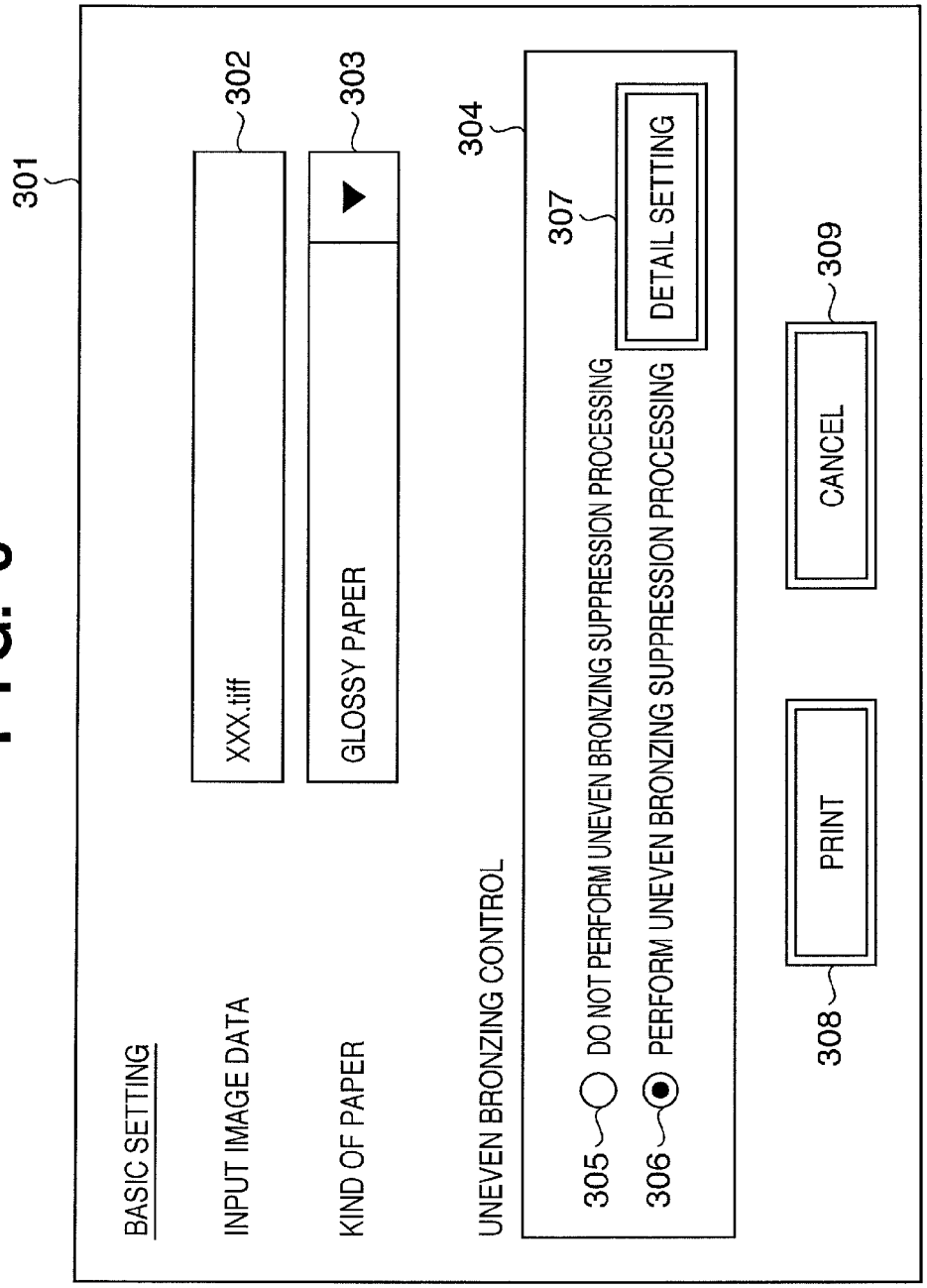
FIG. 3 is a view illustrating an example of a GUI (Graphical User Interface) to select printing conditions displayed on a display unit in the embodiment.

FIG. 3 is a view illustrating an example of a GUI (Graphical User Interface) to select printing conditions displayed on the display unit 204. Various types of settings using this window are performed by using the keyboard or pointing device of the input unit 205. This also applies to a GUI illustrated in FIG. 4.

Reference numeral 301 denotes a basic window of the GUI according to this embodiment. A text box 302 is used to indicate desired image data. A file name and the like of image data is input in the text box 302. A combo box 303 is used to select a printing medium to be used upon printing by the image output unit 1060. This combo box 303 can select an arbitrary printing medium from all kinds of printing media usable in this embodiment. A group box 304 includes buttons to alternatively select one of radio buttons 305 and 306. The radio button 305 is a button to select a mode in which uneven bronzing suppression processing is not performed. When the radio button 305 is selected (checked), an image is printed using the basic color separation LUT without performing uneven bronzing suppression processing. The radio button 306 is a button to select a mode in which uneven bronzing suppression processing is performed. The group box 304 includes a detail setting button 307 so that a user can select the detailed mode to suppress uneven bronzing after the radio button 306 is selected. A print button 308 is a button to indicate printing in the above-described setting. A cancel button 309 is a button to indicate a cancellation of printing.

Figure 4:
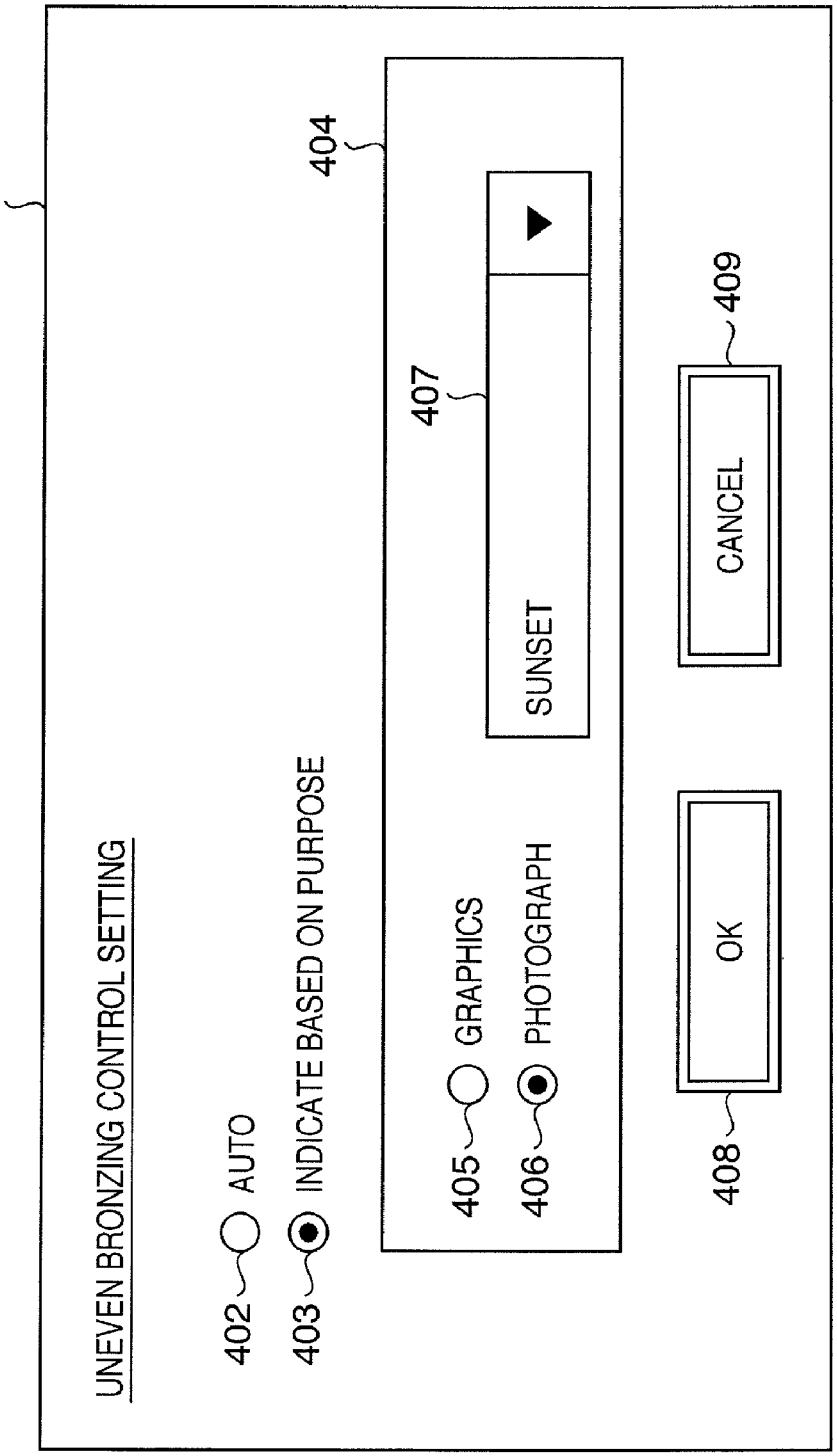
FIG. 4 is a view illustrating an example of a GUI displayed on the display unit according to the embodiment, for use to select an uneven bronzing control method.

FIG. 4 is a view illustrating an example of a GUI displayed on the display unit 204, which is for use to select an uneven bronzing control method.

A window 401 is a window for setting the details of uneven bronzing suppression processing. The window 401 is activated, for example, in a pop-up form by indicating (clicking) the detail setting button 307 in FIG. 3. A radio button 402 is a button for selecting a mode to automatically suppress uneven bronzing. A radio button 403 is a button for selecting a mode to designate the uneven bronzing suppression method based on a purpose (based on the kind of an image). A group box 404 is a box for alternatively selecting one of radio buttons 405 and 406. Although not particularly illustrated in FIG. 4, the radio buttons 402 and 403 are set to be alternatively selected. The radio buttons 405 and 406 are used to select the category of an image. The radio button 405 selects a "graphics" mode. The "graphics" mode is a mode to output an image which has a high ratio use of a comparatively high chroma region. When the radio button 406 is selected, an image is printed in a "photograph" mode. A combo box 407 is used to designate the mode in detail when the "photograph" mode is selected. The "photograph" mode in this embodiment is a mode to output an image which has a high ratio of use of a comparatively low chroma region. In this embodiment, a "sunset" mode which comparatively frequently uses a region near red is exemplified in the combo box 407 in FIG. 4. Other examples of the mode are an "ocean" mode which comparatively frequently uses a region near bluer a "mountain" mode which comparatively frequently uses a region near green, a "person" mode which comparatively frequently uses a region near a skin color, and the like. It is preferable that a mode other than these modes can be designated for each color region with a high ratio of use. In addition to the above-described "graphics" mode and "photographic" mode, a "general" mode to suppress uneven bronzing in the whole color region to be reproduced may be set. When an OK button 408 is activated, the various items set by using the window 401 are reflected on the basic setting. A cancel button 409 cancels the setting by the window 401 and returns the setting to the basic setting mode.

In the GUI according to this embodiment, the text box, combo box, radio box, and the like arranged in each window are not limited to those described above as long as they have the corresponding functions capable of selecting a predetermined image data, printing medium data, and print mode.

In the above description of the GUI, the windows illustrated in FIGS. 3 and 4 are described as different ones. However, the number of windows does not matter as long as they have the above-described functions.

<Detail of Bronzing Measurement Unit>

Figure 5:
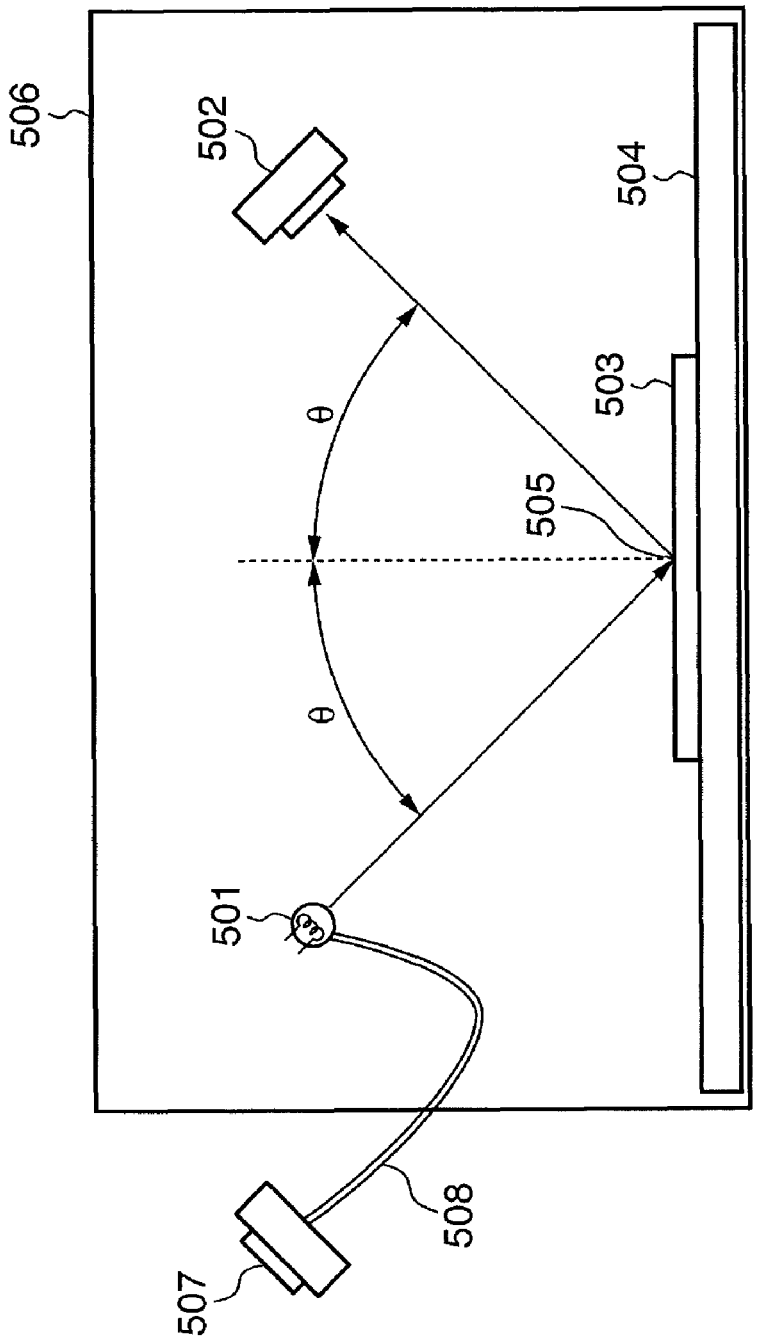
FIG. 5 is a view for explaining a measurement method in a bronzing characteristic measurement unit according to the embodiment.

FIG. 5 is a view for explaining a patch image measurement method in the bronzing characteristic measurement unit 1043 according to this embodiment.

An illumination device 501 illuminates a printing medium 503 to be evaluated. The illumination device can be a halogen lamp, xenon lamp, ultra-high pressure mercury lamp, deuterium lamp, or a combination of a plurality of these light sources. A photodetector 502 receives and detects reflected light from the printing medium 503 to be evaluated. A detector used for the photodetector 502 can be a single light-receiving surface type photodiode, photoelectric tube, photo-multiplier, a multielement light-receiving surface type Si photodiode array, CCD, or the like. The photodetector 502 may have a structure to split light, for example, a diffraction grating or prism. The photodetector 502 is located at a position tilted by the same angle $\theta$ as but on the side opposite to the illumination device 501 with respect to the normal line to the printing medium 503. That is, the photodetector 502 is located in the specular reflection direction. The illumination device 501 and photodetector 502 may respectively include lens systems. The printing medium 503 is placed on and fixed to a sample fixing table 504. The sample fixing table 504 desirably includes a fixing means which uses, for example, electrostatic chucking or vacuum suction by an air pump to keep the printing medium 503 as flat as possible. Reference numeral 505 denotes a target measurement portion to be measured by the photodetector 502. Reference numeral 506 denotes a shield unit to shield the external light. A photodetector 507 is the same photodetector as the photodetector 502. Reference numeral 508 denotes an optical transmission unit such as an optical fiber. Illumination information about light from the illumination device 501 is transmitted by the optical transmission unit 508 and detected by the photodetector 507. As a method of measurement the illumination information, a white board such as a perfect reflecting diffuser or a mirror may be used as a measurement target and the spectral strength of specular reflected light from the target may be measured by the photodetector 502. Alternatively, without going through the optical transmission unit 508, the illuminating light may be split by a beam splitter or the like and measured by a detector other than the photodetector 502.

A method of calculating a bronzing characteristic from specular reflected light from the printing medium 503 measured in the above manner will be described next. Tristimulus values Xx, Yx, and Zx of specular reflected light are calculated from spectral strength Rx(X) of the specular reflected light from the printing medium 503 measured by the photodetector 502 by:

$$Xx = \int Rx(\lambda) x^{\wedge}(\lambda) d\lambda$$

$$Yx = \int Rx(\lambda) y^{\wedge}(\lambda) d\lambda$$

$$Zx = \int Rx(\lambda) z^{\wedge}(\lambda) d\lambda \quad (1)$$

The integral interval is the visible range of a human (e.g., $\lambda$=380 to 780 nm). "x^" is an overbar of x, and "y^" and "z^" are overbars of y and Z, respectively. x^($\lambda$), y^($\lambda$), and z^($\lambda$) are color matching functions in an XYZ color system. These are also applicable to equations (2) and (3) below.

In equation (1), since the optical system in FIG. 5 measures specular reflected light, the range of the measurement value of the specular reflected light from, e.g., glossy paper with a large degree of gloss becomes close to that of a measurement value of the illumination device 501 (light source) measured by the photodetector 507. That is, the optical system is similar to a measurement system which directly measures light from a light source. Accordingly, unlike calculation of tristimulus values of a body color by normal reflection, equation (1) regards the spectral strength of specular reflected light as the relative specular distribution of a light source and follows a calculation method of tristimulus values of the light source color. $x\wedge(\lambda)$, $y\wedge(\lambda)$, and $z\wedge(\lambda)$ in equation (1) are color matching functions of JIS Z8782. Normalization by multiplying a proportionality constant is not performed in this embodiment. However, normalization may be performed by multiplying:

$$K=100/\int Rx(\lambda)y\wedge(\lambda)d\lambda \quad (2)$$

Tristimulus values Xs, Ys, and Zs of an illumination are calculated by equation (3) from spectral strength $S(\lambda)$ of the illumination measured by the photodetector 507. Equation (3) is a conversion formula which is based on a calculation method of tristimulus values of a light source color and calculates the tristimulus values Xs, Ys, and Zs from spectral data of the illumination.

$$Xs=k\int S(\lambda)x\wedge(\lambda)d\lambda$$

$$Ys=k\int S(\lambda)y\wedge(\lambda)d\lambda$$

$$Zs=k\int S(\lambda)z\wedge(\lambda)d\lambda \quad (3)$$

$x\wedge(\lambda)$, $y\wedge(\lambda)$, and $z\wedge(\lambda)$ of equation (3) are color matching functions of JIS Z8782. k of equation (3) is a proportionality constant which is determined such that the tristimulus value Ys equals a measured luminous quantity.

Next, a L*a*b* value of the specular reflected light from the printing medium 503 is calculated, based on JIS Z8729, from the tristimulus values Xx, Yx, and Zx of the specular reflected light which is reflected by the printing medium 503 to be evaluated and which is detected by the photodetector 502, and the tristimulus values Xs, Ys, and Zs of the light which is from the illumination device 501 and detected by the photodetector 507. Note that, values of X, Y, and Z in equations (1) to (4) of JIS Z8729 use the tristimulus values Xx, Yx, and Zx of the specular reflected light from the printing medium 503, and values of Xn, Yn, and Zn use the tristimulus values Xs, Ys, and Zs of the light source. That is, values of a* and b* are calculates by:

$$a^*=500\{f(Xx/Xs-f(Yx/Ys)\}$$

$$b^*=200\{f(Yx/Ys-f(Zx/Zs)\} \quad (4)$$

where
if Xx/Xs>0.008856, $f(Xx/Xs)=(Xx/Xs)^{1/3}$,
if Xx/Xs<0.008856, f(Xx/Xs)=7.78(Xx/Xs)+16/116,
if Yx/Ys>0.008856, $f(Yx/Ys)=(Yx/Ys)^{1/3}$,
if Yx/Ys<0.008856, f(Yx/Ys)=7.78(Yx/Ys)+16/116,
if Zx/Zs>0.008856, $f(Zx/Zs)=(Zx/Zs)^{1/3}$, and
if Zx/Zs<0.008856, f(Zx/Zs)=7.78(Zx/Zs)+16/116.

Since bronzing is relevant not to the brightness of the reflected image of the illumination device 501 but its tint, in this embodiment, the value of L* to represent the value of brightness is not used for evaluation. In this embodiment, an example of calculating an L*a*b* value by using a spectral strength utilizing, for example, a diffraction grating is described. However, the photodetectors 502 and 507 may use a method of photoelectrically, directly reading the tristimulus values X, Y, and Z by using, for example, a color filter. The same discussion about a spectral strength holds by using other spectral characteristic value such as a spectral radiance.

Figure 6:
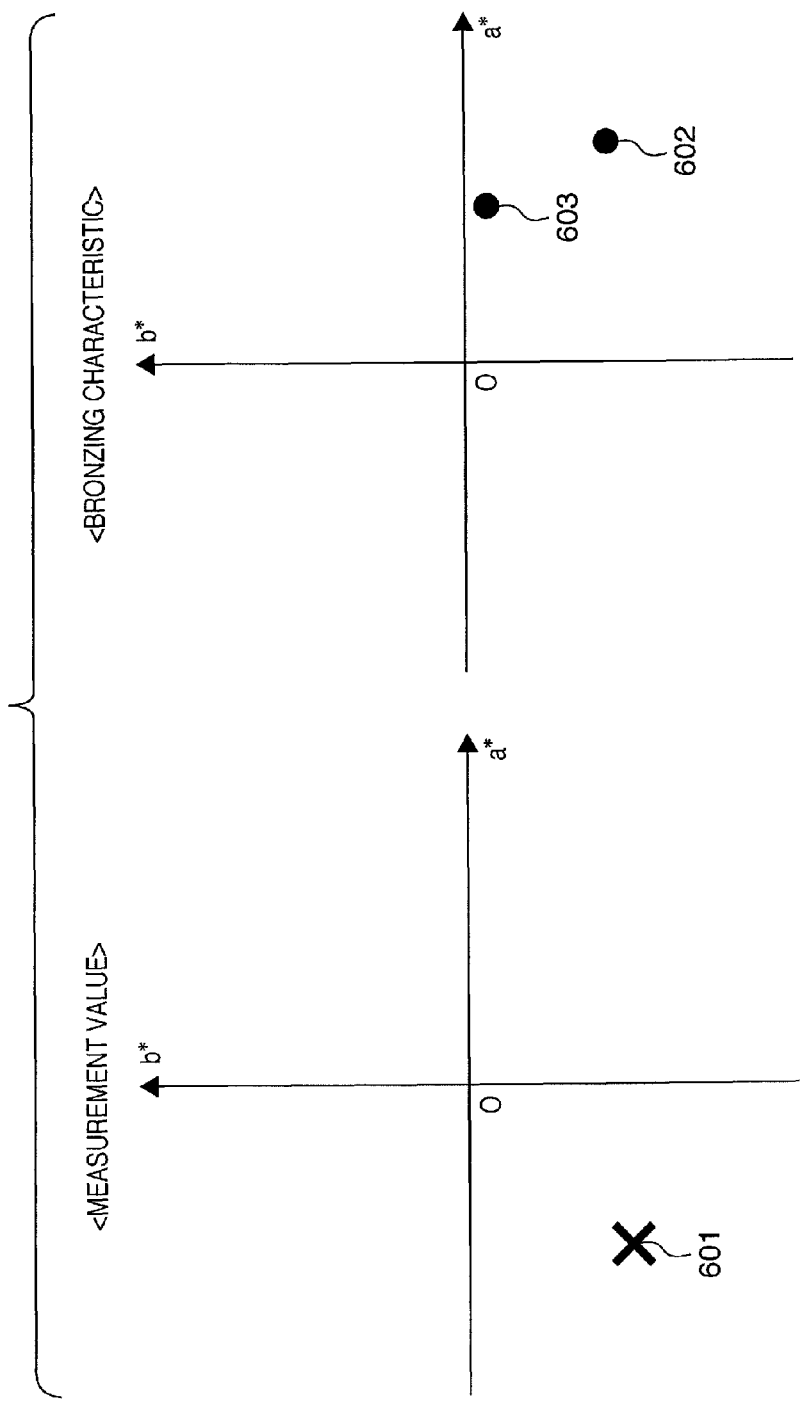
FIG. 6 shows graphs of an example of a measurement result of a bronzing characteristic according to the embodiment.

FIG. 6 shows graphs of an example of a measurement result of the above-described bronzing characteristic.

A point 601 indicates a measurement value (measurement value of a color) of a patch with a given chromaticity printed by the image output unit 1060 used in this embodiment. That is, the point 601 indicates a measurement value measured by a general color measuring geometrical optical system (e.g., an optical system which illuminates a sample from a direction tilted by an angle of 45° with respect to the normal line to the sample and receives the light at an angle of 0°). A point 602 indicates a bronzing characteristic (bronzing measurement value) of a patch generated by adjusting the kind and amount of the color materials such that the reproduced color has the measurement value indicated by the point 601. That is, as described above with reference to FIG. 5, the point 602 indicates not the patch color but a*b* of the specular reflected light from the sample, that is, a bronzing characteristic. A point 603 indicates a bronzing characteristic of a patch generated by adjusting the combination of the different kind and amount of the color materials from the patch indicated by the point 602 such that the measurement value equals value indicated by the point 601. That is, even when the same color is reproduced, the bronzing characteristic generally differs in each combination of the kinds and amounts of the color materials to be used. In addition, the bronzing characteristic differs in each kind of a printing medium.

<Details of Processing Content>

A processing sequence executed by the UI unit 1010 and color separation LUT determination unit 1020 in FIG. 1 in this embodiment will be described in detail with reference to FIGS. 7 to 10.

Figure 7:
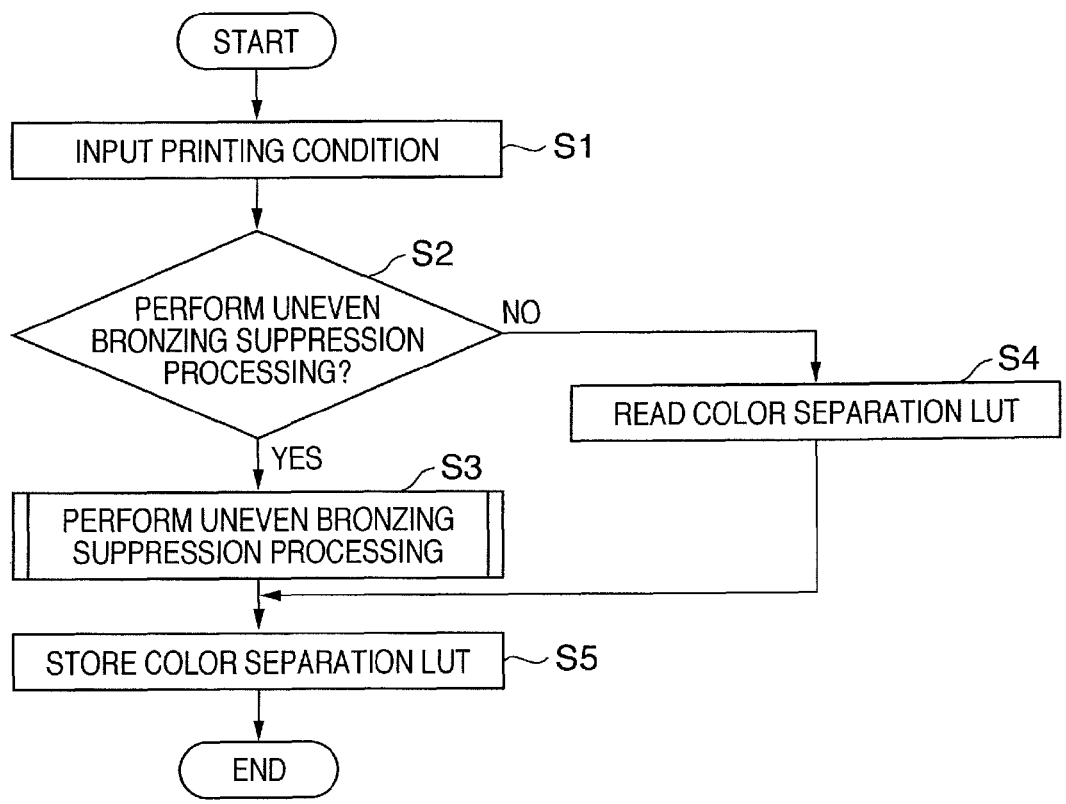
FIG. 7 is a flowchart for explaining the basic processing executed by the image processing apparatus according to the embodiment.

FIG. 7 is a flowchart for explaining the basic processing executed by the image processing apparatus according to this embodiment. A program to execute this processing is installed on the HD 206 and loaded into the RAM 202 upon execution.

First, in step S1, a user inputs printing conditions by using the UI unit 1010. The printing conditions include information about input image data, printing medium data (kind), and whether to perform uneven bronzing suppression processing, which can be set in the GUI illustrated in FIG. 3. In addition, the printing conditions include uneven bronzing suppression processing information to select automatic processing or an arbitrary mode by manual setting upon performing the uneven bronzing suppression processing, and a setting of image category information to select an arbitrary image category upon manual setting (see FIG. 4).

The process advances to step S2 to determine based on the printing conditions input in step S1 whether to perform bronzing suppression processing. If the result is YES in step S2, the process advances to step S3 to perform the bronzing suppression processing and generate a predetermined color separation LUT. The detailed processing content in step S3 will be described later.

If the result is NO in step S2, the process advances to step S4 to read a basic color separation LUT stored in the basic color separation LUT storage unit 1034 in FIG. 1 in advance. The process advances to step S5 after executing processing in step S3 or S4, and the color separation LUT generated in step S3 or the color separation LUT read in step S4 is stored in the color separation LUT storage unit 1023.

Figure 8:
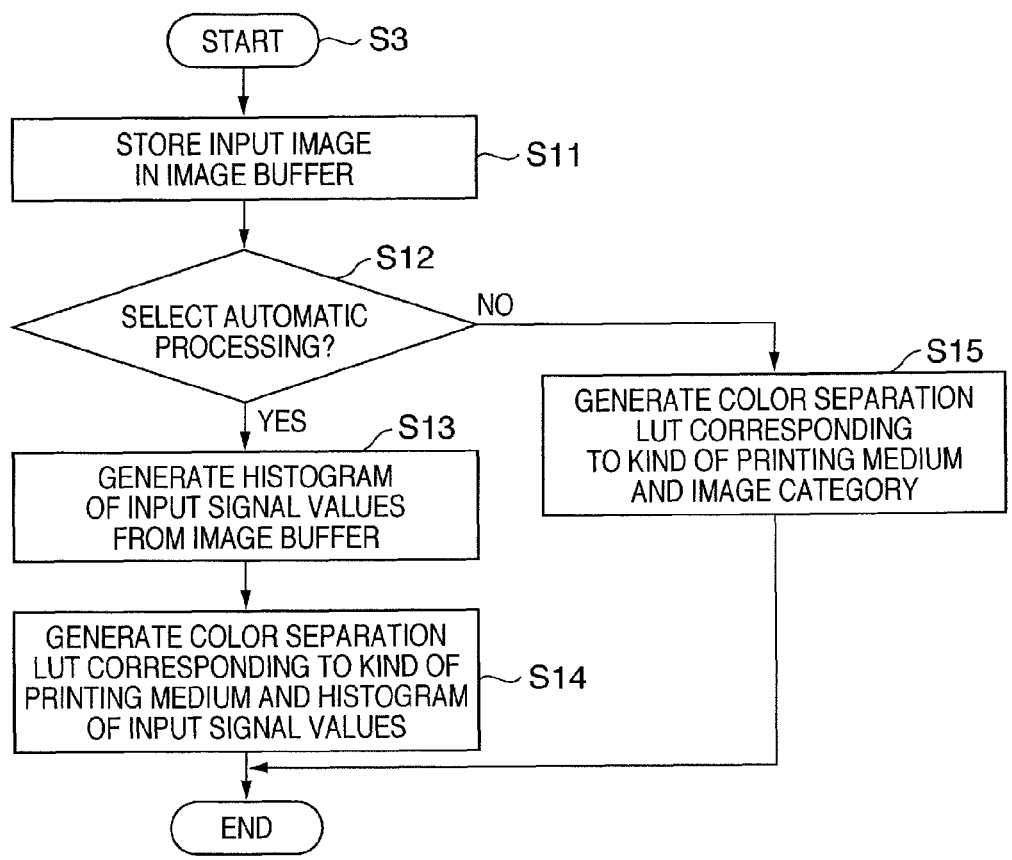
FIG. 8 is a flowchart showing the detailed content of uneven bronzing suppression processing in step S3 of FIG. 7.

FIG. 8 is a flowchart showing the detailed content of the bronzing suppression processing in step S3 of FIG. 7.

First, in step S11, image data input from the image input unit 1050 is stored in an image buffer of the RAM 202. This input image data is indicated by the text box 302 in FIG. 3. In step S12, whether "automatic processing" is selected by the radio button 402 in FIG. 4 is determined. If the result is YES in step S12, the process advances to step S13 and a histogram of image data values is generated based on the image data stored in the image buffer in step S11. Input signal values in this embodiment are for example, RGB signal values presented in an RGB color space. However, they may be L*a*b* values in a CIE-Lab color space converted by using a predetermined conversion formula. Next, the process advances to step S14 to generate a color separation LUT corresponding to the kind of the printing medium input in step S1 (FIG. 7) and the histogram of the input signal values generated in step S13. In step S14, characteristic data with a least bronzing effect in association with the input image and printing conditions is extracted from the bronzing characteristics which are obtained by using the various kinds of color materials and printing media, measured by the bronzing measurement unit 1040, and stored in the bronzing characteristic storage unit 1033. The table values of color separation LUT data are generated based on the characteristic data thus extracted, thereby generating a color separation LUT.

On the other hand, if the result is NO in step S12, the process advances to step S15 to generate a color separation LUT corresponding to the kind of the printing medium input in step S1 and the image category indicated by the group box in FIG. 4. In step S15, characteristic data with a least bronzing effect in association with the image category and printing conditions is extracted from the bronzing characteristics which are obtained by using the various kinds of color materials and printing media, measured by the bronzing measurement unit 1040, and stored in the bronzing characteristic storage unit 1033. The table values of color separation LUT data are generated based on the characteristic data thus extracted, thereby generating a color separation LUT.

A method of determining a representative point corresponding to the image category selected by the user and the histogram of the input signal values of the pixels of the input image will be described with reference to FIG. 9.

Figure 9:
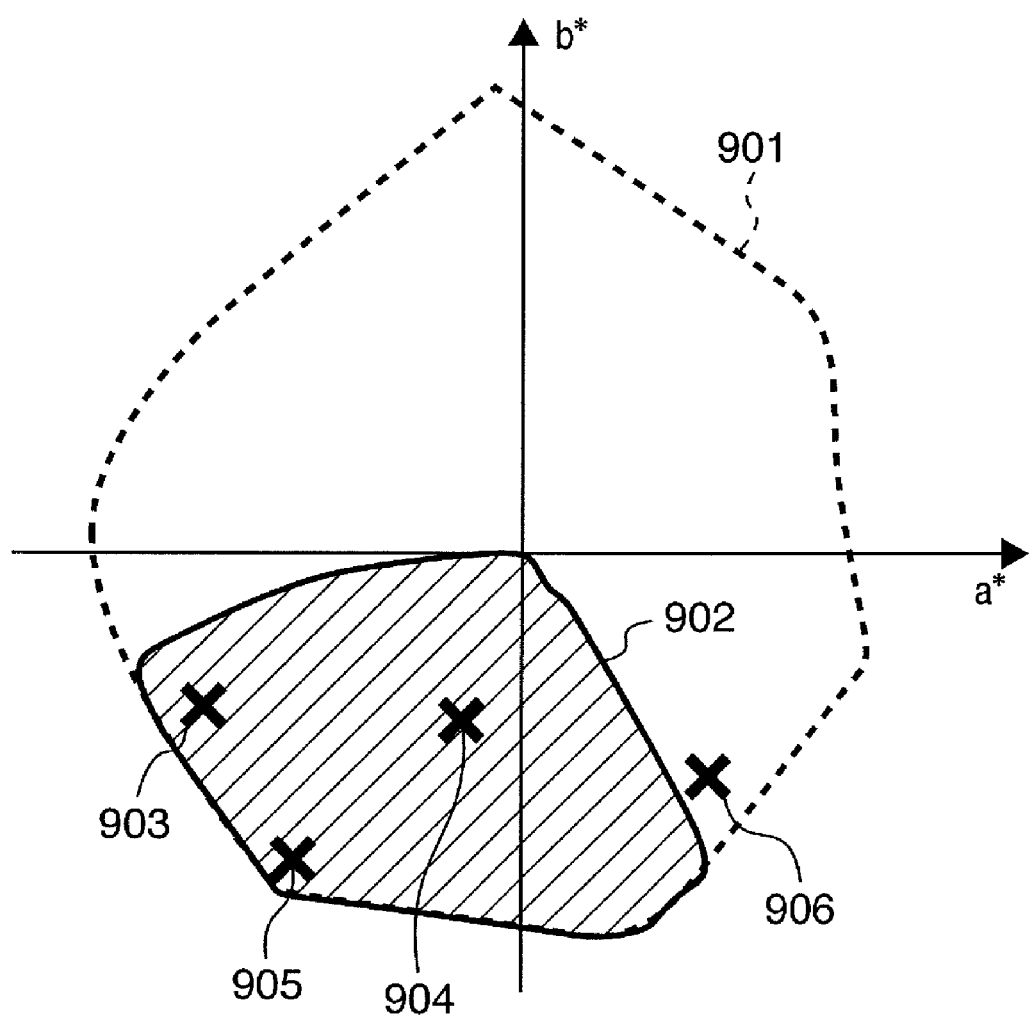
FIG. 9 is a conceptual diagram showing a region in which uneven bronzing suppression processing according to a mode selected by a user is performed in the embodiment.

FIG. 9 is a conceptual diagram showing a region in which the uneven bronzing suppression processing corresponding to the mode selected by the user is performed in this embodiment. A color separation determination method for a representative point will be described by exemplifying a case wherein the "ocean" mode is selected by the combo box 407 in FIG. 4.

Reference numeral 901 denotes a color gamut of the image output unit 1060 according to this embodiment on an a*b* plane with a predetermined L* in a CIE-Lab color space. Reference numeral 902 denotes a color region which is frequently used when the "ocean" mode is selected. The color region 902 is set for each mode in advance. When an image in which the color region 902 frequently appears is to be printed, the following processing is executed to generate a color separation LUT for suppressing uneven bronzing. Points 903 to 906 indicate color measurement values. In order to suppress the uneven bronzing among representative points of the points 903 to 905, color separation for each representative point is determined. For the point 906 which is outside the color region 902, color separation determined in advance in consideration of the other image quality element such as the graininess or tone character is used. According to the method of setting the region in which the uneven bronzing is suppressed in step S14 of FIG. 8, a region in a range which exceeds a predetermined threshold in accordance with the appearance frequency level with reference to the histogram of the signal values of the input image is set to be suppressed.

Figure 10:
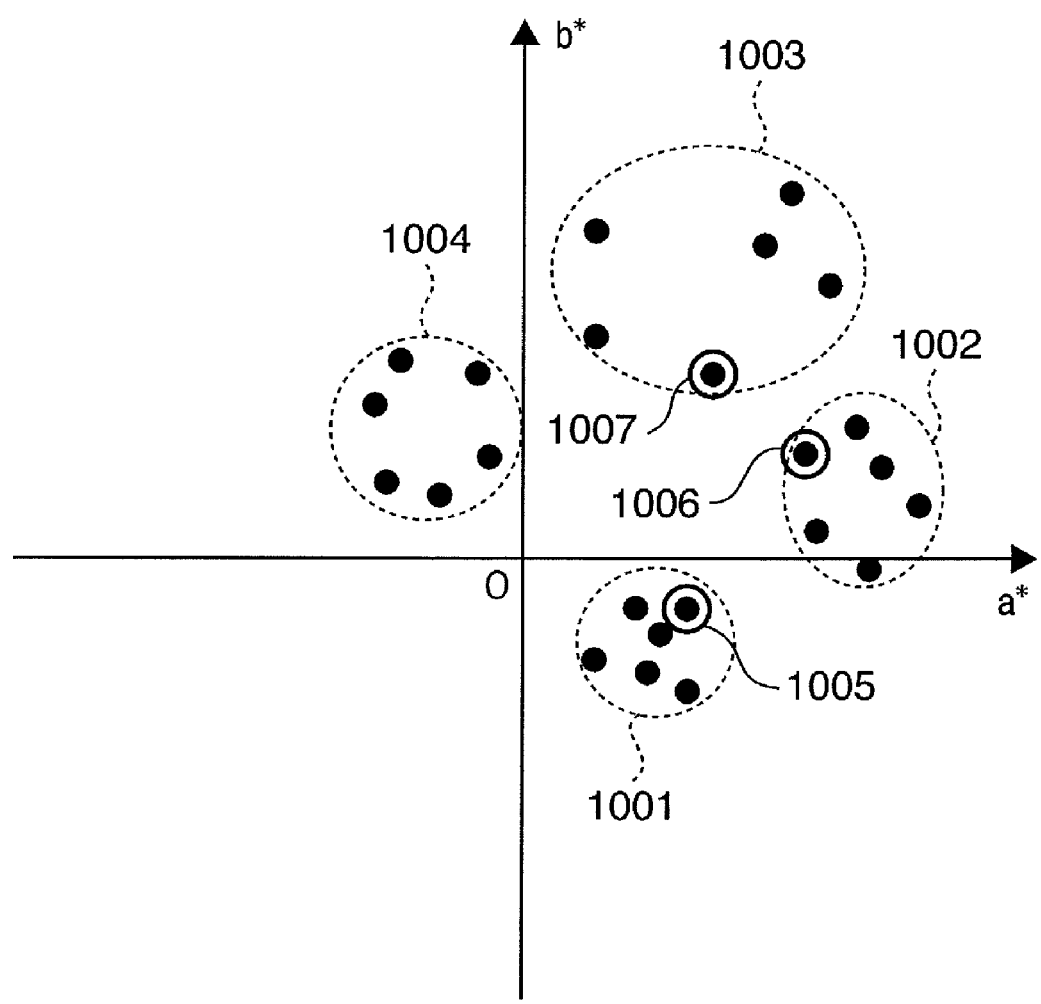
FIG. 10 is a graph for explaining a method of determining color separation for each representative point in a region which is shown in the color region in FIG. 9 and in which uneven bronzing is suppressed.

FIG. 10 is a graph for explaining a method of determining color separation for each representative point in a region which is shown in the color region 902 in FIG. 9 and in which the uneven bronzing is suppressed.

The points 903 to 905 indicate the measurement values within the region in which the uneven bronzing is suppressed, and the point 906 indicates the measurement value outside that region (see the color region 902 in FIG. 9). A set 1001 is a set of the bronzing characteristics of a plurality of patches obtained by adjusting the colors and amounts of the color materials such that the measurement values of the patches equal value indicated by the point 903. As described with reference to FIG. 6, even when the same color (point 903) is reproduced, different bronzing characteristics appear as shown in the set 1001. Similarly, a set 1002 is a set of the bronzing characteristics of a plurality of patches obtained by adjusting the colors and amounts of the color materials such that the measurement values of the patches equal value indicated by the point 904. A set 1003 is a set of the bronzing characteristics of a plurality of patches obtained by adjusting the colors and amounts of the color materials such that the measurement values of the patches equal value indicated by the point 905. A set 1004 is a set of the bronzing characteristics of a plurality of patches obtained by adjusting the colors and amounts of the color materials such that the measurement values of the patches equal value indicated by the point 906. As described above, no uneven bronzing suppression is performed to the measurement value indicated by the point 906 which is outside the color region 902. Color separation to reproduce a predetermined color, which is the subject of uneven bronzing suppression, is determined from the sets 1001 to 1003 other than the set 1004. According to this color separation determination method, a point is selected from each set such that the distances among the three points respectively selected from the sets 1001 to 1003 become minimum. The color separation corresponding to the selected point is determined as the color separation to reproduce the predetermined color, which is the subject of uneven bronzing suppression.

More specifically, for example, the following processing is executed. First, the barycenter of each set is calculated, and the general barycenter is calculated from the three obtained barycenters. A point closest to the general barycenter is selected as a representative point 1005 of the set 1001 from the points inside the set 1001. The combination and colors of the color materials which generates the bronzing characteristic indicated by the representative point 1005 are determined as the color separation to reproduce the measurement value indicated by the point 903. Similarly, representative points 1006 and 1007 are selected from the sets 1002 and 1003, respectively, to determine the color separations to reproduce the measurement values indicated by the point 904 and 905.

The method of selecting the representative points is not limited to the one described above. For example, the general barycenter may be calculated from all points inside the sets 1001 to 1003 without calculating the barycenter of each set, and the point closest to the general barycenter may be selected as the representative point of each set. Otherwise, a sum of color differences from a given point inside a set to another given point inside the other set is calculated for all points. A representative point may be determined such that a value obtained by adding all sums of color differences about all points becomes minimum.

The "general" mode is exemplified in the description of the GUI illustrated in FIG. 4. A color separation LUT may be generated in advance to minimize the uneven bronzing among representative points which are set for the whole color gamut, and this LUT may be set on the GUT.

After the combination of the use amounts of the color materials for each representative point is determined, desired interpolation processing is performed based on the color separation of the neighboring representative point, thereby generating a color separation LUT.

As described above, a color separation LUT for suppressing the uneven bronzing of the output image is determined based on the category of the image selected by the user or the histogram of the input image data values.

Considering the processing speed, it is desirable to store a plurality of color separation LUTs corresponding to the print modes unless the "automatic" processing is selected using the radio button 402 in FIG. 4. However, a color separation LUT may be generated upon printing similarly to the case in the automatic processing.

Other Embodiment

The present invention can be implemented by supplying a software program, which implements the functions of the foregoing embodiment, directly or indirectly to a system or apparatus, reading the supplied program with a computer of the system or apparatus, and then executing the program. In this case, so long as the functions of the program are implemented, they need not always come in the form of a program.

Accordingly, the program code installed in the computer in order to implement the functional processing of the present invention by the computer also implements the present invention. In other words, the claims of the present invention also include a computer program itself for the purpose of implementing the functional processing of the present invention. In this case, so long as the functions of the program are provided, they may be implemented in any form, such as an object code, a program executed by an interpreter, or script data supplied to an OS.

Various kinds of media can be used as a storage medium for supplying the program. Examples are a floppy (registered trademark) disk, a hard disk, an optical disk, a magneto-optical disk, an MO, a CD-ROM, a CD-R, a CD-RW, a magnetic tape, a non-volatile type memory card, a ROM, and a DVD (DVD-ROM and DVD-R).

As for the method of supplying the program, a client computer can be connected to a homepage on the Internet using a browser of the client computer, and the program can be downloaded from the homepage to a recording medium such as a hard disk. In this case, the computer program of the present invention or an automatically installable compressed file of the program may be downloaded. Further, the program of the present invention can be supplied by dividing the program code constituting the program into a plurality of files and downloading the files from different homepages. In other words, a WWW server that causes multiple users to download the program files that implement the functional processing of the present invention by the computer is also included in the claims of the present invention.

The program of the present invention may be encrypted and stored on a storage medium such as a CD-ROM and distributed to users. In this case, users, who meet certain requirements, download decryption key information from a homepage via the Internet and decrypt the encrypted program by using the key information, thereby executably installing the program in the user computer.

The functions according to the aforementioned embodiment can be implemented by executing the read program by computer, or by other manners. For example, an OS or the like running on the computer may perform all or a part of the actual processing on the basis of an instruction of the program so that the functions of the foregoing embodiment can be implemented by this processing.

Furthermore, the program read from the storage medium may be written to a function expansion board inserted into the computer or to a memory provided in a function expansion unit connected to the computer. In this case, after writing the program, a CPU or the like mounted on the function expansion board or function expansion unit performs all or a part of the actual processing based on an instruction of the program so that the functions of the foregoing embodiment can be implements by this processing.

As has been described above, according to the embodiments, a color separation method for controlling uneven bronzing can be determined in accordance with an image and printing medium. Furthermore, it is possible to allow a user to select a desired mode to suppress uneven bronzing in accordance with an image and printing medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-110101, filed on Apr. 12, 2006, which is hereby incorporated by reference herein in its entirety.

What is claimed is:

1. A color processing method of determining color separation data corresponding to color materials used in a printing apparatus, comprising:
    using a processor to perform the steps of:
    an inputting step of inputting, for each of a plurality of representative colors, a plurality of color separation data, each of the plurality of color separation data being capable of reproducing the representative color having a different bronzing tint; and
    a determining step of determining, for each of the plurality of representative colors, a color separation data among the plurality of color separation data being capable of reproducing the representative color so as to decrease a difference between the bronzing tints among the plurality of representative colors.

2. The method according to claim 1, wherein said bronzing tint is obtained by measuring a tint of specular reflected light from an image printed on a printing medium by use of the color separation data which is capable of reproducing the representative color.

3. The method according to claim 1, further comprising:
    an obtaining step of obtaining characteristic data of an image printed under a printing condition acceptable by the printing apparatus; and
    a setting step of setting, based on the characteristic data, a color region which includes at least a part of the plurality of representative colors,
    wherein the inputting step inputs, for each of the plurality of representative colors included in the color region, the plurality of color separation data, each of which is capable of reproducing the representative color having the different bronzing tint.

4. The method according to claim 3, wherein said characteristic data is a type of the image.

5. The method according to claim 3, wherein said characteristic data is a histogram of the image.

6. The method according to claim 3, wherein said printing condition includes a type of a printing medium and a type of color materials used for printing.

7. The method according to claim 3, wherein said printing condition includes a printing mode.

8. The method according to claim 3, further comprising:
a displaying step of displaying a user interface for use in designating the printing condition,
wherein the obtaining unit obtains the printing condition through the user interface.

9. A color processing apparatus for determining color separation data corresponding to color materials used in a printing apparatus, comprising:
an inputting unit that inputs, for each of a plurality of representative colors, a plurality of color separation data, each of the plurality of color separation data being capable of reproducing the representative color having a different bronzing tint; and
a determining unit that determines, for each of the plurality of representative colors, a color separation data among the plurality of color separation data being capable of reproducing the representative color so as to decrease a difference between the bronzing tints among the plurality of representative colors.

10. A non-transitory computer readable medium storing a computer program that causes a computer to execute the color processing method according to claim 1.

* * * * *